Sept. 19, 1967  J. F. DANIELS ET AL  3,343,011

OSCILLATING ELECTROMAGNETIC MOTOR

Filed April 5, 1965

INVENTORS.
JOHN F. DANIELS
DAVID R. LOCKE
BY
John F. Williams
ATTORNEY 3,343,011
OSCILLATING ELECTROMAGNETIC MOTOR
John F. Daniels and David R. Locke, Bridgeport, Conn., assignors to Sperry Rand Corporation, New York, N.Y., a corporation of Delaware
Filed Apr. 5, 1965, Ser. No. 445,493
8 Claims. (Cl. 310—21)

ABSTRACT OF THE DISCLOSURE

This disclosure is directed to a vibratory electromagnetic device wherein a rotor unit is provided for oscillation relative to a stator member. The rotor unit comprises an oscillator member and an armature member mounted for individual and independent adjustment on a pivot member whereby the initial at-rest position of either member may be adjusted without varying the position of the other member. Means are provided on the members for securing the members in adjusted positions for pivotal vibratory oscillation in unison on the pivot member.

---

This invention relates to a vibratory device and more particularly to an oscillating motor for electric dry shavers.

Such motors are usually mounted within a small compact case which carries the shearing head of the shaver for reciprocation by a driving arm extending from the armature of the motor actuated by a combination of magnetic and resilient forces acting on the effective mass of the vibrating armature system.

A vibratory device of this type includes a base, which may be part of the case or a separate piece fixed in some way therein, an electromagnetic field member and an armature unit both attached to fix the field member as a stator and to allow pivotal movement of the armature unit relative to the base and field member, resilient means supported relative to the base and connected to the armature unit in such a way as to establish an initial or at-rest position relative not only to the pole faces of the unit but also relative to the stationary cutter at the driving arm.

An object of the invention is to provide a new and improved vibrator including a field member and an armature both having complementary poles the faces of which are normally offset so that the stator pole faces slightly overlap the adjacent pole face of the armature to a desired degree when they are in an initial position of balance determined by adjustment as well as the resilient means part of the vibrator.

Another object is to provide for a shaver a vibratory motor having a rotor unit including two parts to allow relative movement between them for adjustment before final assembly.

Another object is to provide such a unit including a driving arm simultaneously positionable to an initial position of the arm independently of that of the rotor pole faces to get optimum action at the cutters, while permitting adjustment at the pole faces.

Another object is to provide a reliable electromagnetic vibrator wherein the polar offset at gaps between the vibratory armature and the stator element may be readily adjusted without impairing the desired initial position of the driving arm.

Still another object is to provide in the rotor unit of an oscillatory motor an adjustable armature portion preferably of symmetrical construction so that this portion is reversible for ease of assembly with a separate oscillator portion without loss of adjustability of one portion with respect to the other.

A further object is to provide in a motor of the class described an adjustable assembly whereby the normal and initial degree of circumferential misalignment, entry or penetration of the armature pole faces relative to the stator pole faces may be readily altered as desired by means of a simple and efficient mechanism.

These and other objects and advantages will be more clearly evident from a description of one specific embodiment of this invention when taken together with the accompanying drawing of the same wherein.

Figure 2:
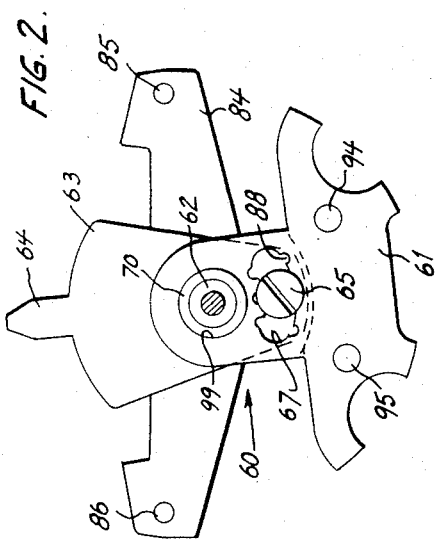
FIG. 2 is a fragmentary elevational view from the back, as seen in FIG. 1, showing the armature construction mounted on a shaft and with an oscillator assembled and variably secured for angular adjustment with respect to the armature.

According to this invention, there is provided an oscillatory rotor construction for adjusting the entry or penetration gap between the armature pole faces of the rotor relative to the stationary pole faces of the stator. The rotor unit, also known as the armature, comprises an adjustable assembly including a magnetic armature part and an oscillator part, made preferably of a resinous plastic. These are mounted for angular adjustment with respect to each other. Securing means is included to lock these parts in final fixed assembly after adjustment.

In general, the invention relates to a motor of the vibratory type in which there is a U-shaped magnetic field generating stator 55 of laminated construction about the core of which there are disposed electric coil exciting means, such as coils 56 and 57 operating on alternating current and a resiliently loaded vibratory armature 61 also of laminated construction as part of a rotor unit 60. This unit disposed on a bearing is adapted to oscillate arcuate pole faces of armature 61 about shaft 62 relative to the companion pole faces formed on the ends of the core legs of the stator. The unit is of the type inclusive of one or more driving arms 64 extending from an oscillator part 63 operably connected to the armature. A pair of springs 71 and 72 substantially of equal construction and strength each extend convergently upwardly between spring mountings on a base portion 80 of the unit and respective abutment portions on opposite sides of the armature or rotor unit at the oscillator 63 for the purpose of positioning the arms when at rest and resonating the armature in coaction with the pulsating electromagnetic field.

In the initial or at-rest position of the rotor unit 60, springs 71 and 72 and their reaction on the armature through the attached oscillator 63 determine the normal initial position of the armature 61 and its circumferentially spaced pole faces with respect to the stator as manifested by the circumferential misalignment or degree of entry of the armature pole faces with respect to the stator pole faces. This is observed as an overlap occuring between opposed faces and is ordinarily known as the "entry gap" or "penetration." In this at-rest position, the initial position of the driving arms 64 is also determined relative to an optimum degree of eccentricity of the arms with respect to the corresponding cutter (not shown). This eccentricity may be obtained by either being built-in the fixed geometry of the spring base portions such as 81 and 82 of the inner case 80, of the springs 71 and 72, and of the armature and oscillator member and/or by adjustment in one way or another.

By this invention, the rotor unit is divided into two main members 61 and 63, and adjustment is made in the relative position at which these members are assembled. Accordingly, both members are mounted for angular adjustment of one with respect to the other at stub shaft 62 and its sleeve bearing 70, about the axis of which these members oscillate in unison as a fixed assembly after adjustment.

Armature member 61, as one main part of the rotor unit 60, is mounted between a non-magnetic base or support member 80 and its plate 84 by means of spaced end hangers 66 and 68 of relatively hard sheet metal. These form identical end support arms with journal apertures 98 and 99, respectively. At these, bearing 70 receives the hangers so they and the laminated armature including the hangers depend from and may swing about the shaft and its bearing. Each hanger also has between its poles and journal aperture an elongated opening, such as arcuate slot 67 in hanger 66 and similar slot 69 in hanger 68, and preferably has gripping means such as fingers 88. Either slot is adapted to receive any suitable fastening means such as screw 65 of a self-tapping type for threaded fastening in an undersize screw hole 73 in member 63 which is deformable relative to the screw and fingers. Because of the locking nature of this arrangement, one screw is usually enough.

Oscillator member 63 is formed of any suitable light weight, nonmagnetic material of adequate strength and preferably a plastic such as fiber reinforced nylon including a shaft bearing opening 74 for also pivotally mounting piece 63 on shaft bearing sleeve 70 between end hangers 66 and 68. Screw hole 73 is formed in member 63 adjacent its lower extremity, i.e. on the side of opening 74 opposite the two driving arms 64. Between them, piece 63 forms a basal connection including a web 77 and opposed side walls of piece 63 spaced and joined by the web to form opposed pockets. These receive ends of springs 71 and 72 at outwardly and downwardly directed web faces in abutment with the V-shaped web 77 the medial plane of which is offset to one side by an angle with respect to the arms 64. At the ends, received over button-like projections or knobs 87 and 88 formed to extend from opposite sides of the web, the springs act to center web 77 and thus offset arms 64.

Oscillator 63 and its web may be shaped otherwise than shown and the springs 71 and 72 may be disposed accordingly, preferably out of line with each other, to either converge or diverge from some base or frame plate portion to extend either upward or downward for oscillator abutment to balance arms 64 at rest at the proper offset from center and also bias the rotor unit with respect to its pivot and the gap between opposed pole faces.

Figure 3:
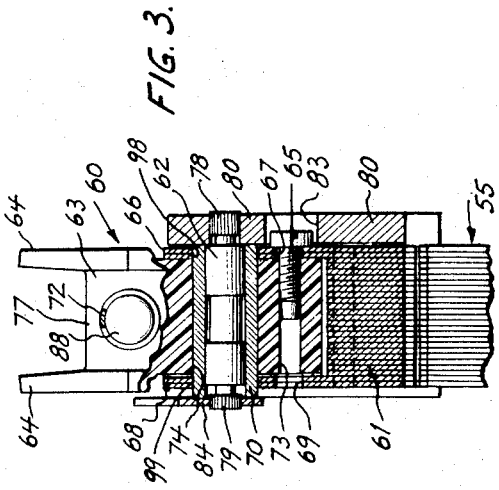
FIG. 3 is a side view taken partly in cross section on line 3—3 of FIG. 1 showing further details of construction.

Screw 65 is receivable in either end of hole 73 through either of slots 67 and 69. To provide for adjustment when the screw is received at slot 67, base 80 has an access opening at 83 (FIG. 3). For utmost fixation, fastening may be provided at both ends of hole 73 and both hangers.

Figure 1:
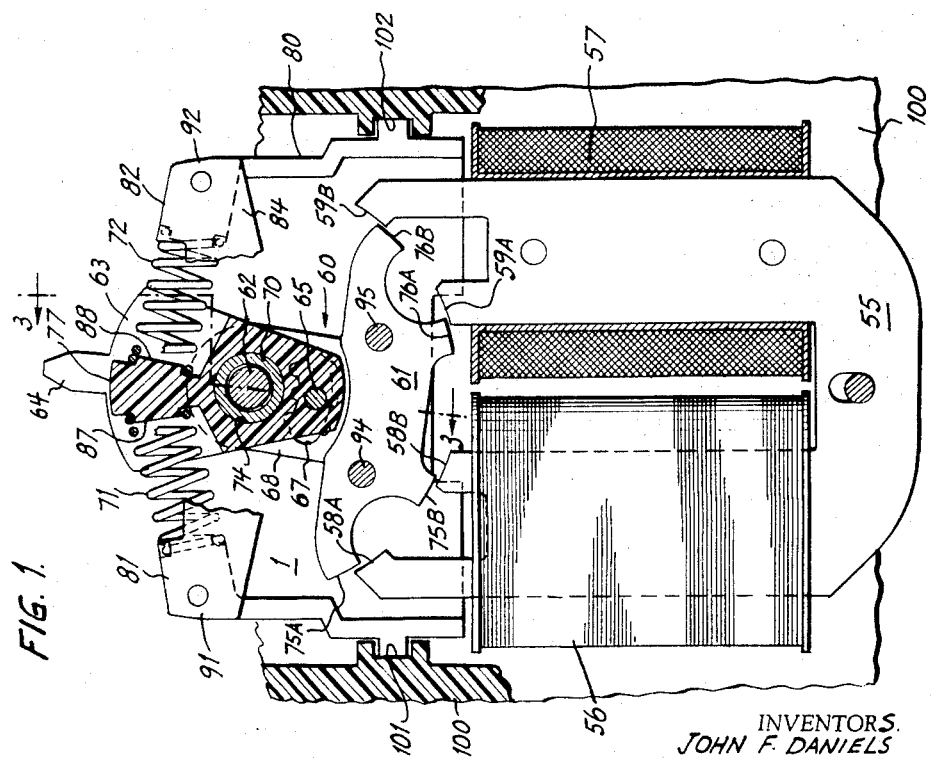
FIG. 1 is a front elevational view partly in cross section of a motor made and adjusted in accordance with this invention with certain parts removed and other parts broken away.

Sleeve 70 is carried rotatably on rotor pivot shaft 62 one end 78 of which is borne in the inner support case or base 80 while the other shaft end 79 is borne in a center opening of inner support backing plate 84 having end holes 85 and 86 for mounting the plate at these holes on projections 91 and 92 to be headed over to complete the assembly with the shaft 62 and its sleeve bearing 70 mounted between base 80 and its plate 84 (FIGS. 1 and 3).

Symmetric construction in the rotor unit makes at least its armature reversible with respect to front and back for the purpose of easy assembly, final adjustment and fastening at screws 65 at one of the slots 67 and 69, one or both edges of which are preferably serrated to form fingers 88 and intervening notches for improved locking as the fingers are bent into member 63.

In the preferred embodiment shown, the motor of this invention when incorporated in an electric shaver is mounted within the assembled halves of an outer casing 100 of molded plastic (only a portion being shown) in which an inner case providing a support member or base 80 of die cast zinc, for example, is slidably received as in casing slots 101 and 102 (FIG. 1) and is clamped mounted in place between the casing halves detachably secured together in any suitable way.

From one end of the outer casing (the upper end, FIG. 1) there protrudes a cutter head assembly (not shown) mounted in any suitable way on the upper end of the inner support member or base 80. One or more cutters such as those shown in U.S. Patent No. 2,793,430 may be driven by one or more upwardly extending driving fingers or arms 64 integrally formed as extensions of the oscillator piece.

Also mounted in the outer casing 100 in any suitable way is U-shaped stator 55 disposed with the ends of both its laminated legs extending up and having formed thereon a series of upwardly and inwardly facing poles to provide circumferentially spaced salient poles with arcuate pole faces 58A and 58B on one leg and arcuate pole faces 59A and 59B on the end of the other leg.

The lower ends of the hangers 66 and 68 and similar ends of the intervening stack of armature laminations, riveted at 94 and 95 in assembly between and with the hangers, are formed with downwardly ad outward extending arms defining one series of circumferentially spaced salient pole faces 75A and 75B of one polarity and another series of such pole faces 76A and 76B of opposite polarity. These faces are of arcuate shape formed with a curvature having a center coincident with the axis of shaft 62.

When the core legs of the stator are properly fixed in place with the companion series of arcuate pole faces of the stator spaced from corresponding armature pole faces by a required gap, all faces are substantially centered on the shaft axis.

In assembling the motor, first the oscillator member 63 is placed between hangers 66 and 68 of the armature member 61 and, with oscillator opening 74 aligned with the hanger apertures, shaft 62 and its sleeve 70 are inserted to pin member 61 and 63 together. The resulting rotor unit 60 may be inserted with either of its end hangers first into base or support member 80. At this stage shaft end 78 is seated in an opening provided for this purpose in base 80. Backing plates 84 is snapped over shaft end 79 and attached to base 80 at 91 and 92.

Next springs 71 and 72 are seated on spring base side portions 81 and 82 of base 80 to extend inwardly and upwardly until their opposite ends seat at knobs 87 and 88 against oscillator member 63. The resulting thrust takes up any clearance between (1) the pivot shaft and its sleeve 70 and (2) armature member 61 and oscillator 63. This helps maintain a uniform and very small gap at the pole faces and makes for quietness of operation.

With the power off, the springs acting on oscillator web 77 also establish the at-rest or initial position of the driving arms 64 with the desired degree of offset shown in FIG. 1. To set the armature and its pole faces in the desired normal position relative to the oscillator and its arms 64, a suitable jig is used to hold the oscillator member 63 with its driving arm or arms in this desired offset position and the armature 61 is turned until a suitable indicator shows that desired entry has been reached at the poles. When this is done, screw 65 is turned down to lock members 61 and 63 in this position. Adjustment of armature 61 is by movement independently of oscillator 63. Entry adjustment does not disturb the aforenoted driving arm offset position.

With the power off, it is also desirable that in the assembled motor the armature be disposed finally with its arm and pole faces in the at-rest position shown in FIG. 1. Here, after the aforenoted adjustment and screw tightening, the leading edge of each armature pole face slightly overlaps the coacting pole face of the stator. For example, in one such motor, a typical face such as 75A overlaps its companion face 58A by from about .015 of an inch to about 0.025 of an inch. In any event, there is adjustment to an entry resulting in obtaining maximum power and stroke.

By this invention more than one model of shaver may be economically assembled using the same armature interchangeably with any one of several oscillators differing, for example, in the number of cutter arms and/or their angle of offset.

It should be understood that while the invention has been described with reference to dry shavers, it is equally well adapted for driving other electrically powered hand operated implements of a small and portable character. Also, changes and modifications can be made in the embodiment described without departing from the spirit and scope of this invention as set forth in the appended claims.

What is claimed is:

1. In a vibratory motor,
    a pivot shaft,
    a magnetic field generating stator having arcuate pole faces adapted to be fixed centered on the axis of said shaft,
    said rotor unit including an armature member pivotally mounted on said shaft for oscillation, said armature member having arcuate pole faces centered on said axis for movement with respect to said stator pole faces from an at-rest position whereat said armature pole faces overlap said stator pole faces by a predetermined degree of entry,
    said rotor unit further including an oscillator member pivotally mounted on said shaft and a driving arm extending from said oscillator member adapted for coaction with selected working means when said oscillator member is moved from an at-rest position,
    said oscillator member and said armature member adapted for pivotal adjustment on said shaft individually and independently of each other for respectively positioning said driving arm and armature pole faces at their selected at-rest positions, and
    means carried by said armature member and said oscillator member for securing said oscillator member to said amature member in said respective adjusted at-rest positions for vibratory pivotal oscillation in unison on said shaft.

2. The combination of claim 1 wherein the armature member includes a pair of spaced support arms having apertures for pivotally mounting said armature member on said pivot shaft, said oscillator member being pivotally received between said arms, at least one of said arms having a slot defining an oversized opening for receiving a fastener member at a side of said oscillator member.

3. The combination of claim 2 wherein said oscillator member has a fastener hole on opposite sides and said aperture support arms are symmetrical and each is formed with an arcuate slot to receive said fastener member in said hole from either side of said oscillator member.

4. In a vibratory motor of the class described for a shaver and the like, the combination comprising
    pivot means,
    a magnetic field generating stator with arcuate pole faces adapted to be fixed centered on the axis of said pivot means,
    an armature member pivotally mounted on said pivot means for oscillation, said armature member having arcuate pole faces centered on said axis for movement with respect to said stator pole faces from an at-rest position whereat said said armature pole faces overlap said stator pole faces by a predetermined degree of entry,
    an oscillator member pivotally mounted on said pivot means and having a driving arm extending from said oscillator member for coaction with working means such as the cutters of said shaver when said oscillator member is moved from an at-rest, eccentric position of said arm; said oscillator member and armature member being angularly adjustable with respect to each other for positioning said arm and armature pole faces at said respective at-rest positions; and
    fastener means for allowing adjustment of said members to adjusted at-rest positions and for securing said members with respect to each other in said adjusted positions;
    said armature member including a support arm having an aperture for pivotally mounting said armature member on said pivot means,
    said oscillator member being of relatively deformable material received against said support arm and having a fastener hole opening on the side of said oscillator member adjacent said arm;
    said support arm having an arcuately edged slot aligned with said fastener hole for receiving a headed fastener in said slot and hole, at least one of the arcuate edges of said slot being serrated to form notches and fingers extending from said support arm for bending of at least one of said fingers into said oscillator member by said headed fastener and simultaneous deformation of part of said material into said notches adjacent said finger,
    said headed fastener and serrated edge providing said fastener means.

5. The motor of claim 4 wherein said support arm at least at the fingers is of relatively hard material and said oscillator member is of a material deformable by said bent finger.

6. A vibratory motor comprising, support means, a stator carried by said support means, said stator having spaced ends provided with pole faces, a shaft mounted on said support means, a vibratory rotor unit mounted on said shaft, said rotor unit including an armature member having pole faces complementary to said stator pole faces, said rotor unit further including an oscillator member having a drive arm extending therefrom, means mounting said oscillator and armature adjacent each other on said shaft for movement individually of each other about said shaft, spring means supported at one end by said support means and at their opposite ends extending towards and engaging said rotor unit to maintain said oscillator member and said armature member at initial at-rest positions on said shaft, said armature member being pivotally adjustable on said mounting means about said shaft away from the at-rest position of the oscillator member to adjust the position of the armature pole faces at a selected overlap relationship with said stator pole faces, and means carried by said rotor unit for securing said armature member to said oscillator member in the adjusted position of said armature member and the initial at-rest position of said oscillator member for vibratory pivotal movement in unison on said shaft.

7. A vibratory motor, comprising a U-shaped electromagnetic stator provided with arcuate pole faces on the ends of the spaced legs thereof, a shaft, an oscillator member pivotally mounted on said shaft and having at least one drive arm extending therefrom, spring means maintaining said oscillator member in a selected at-rest position on said shaft, an armature member including a first portion provided with complementary armature pole faces centered on the axis of said shaft and a second portion comprising a pair of hanger arms pivotally mounting said armature on said shaft adjacent said oscillator, said armature member being pivotal on said hanger arms about said shaft relative to said oscillator to an adjusted moved position to establish a predetermined at-rest position of said armature pole faces relative to said stator pole faces, and means carried by said armature and said oscillator for securing said armature member to said oscillator member against relative movement with respect to each other in the adjusted at-rest positions of said members.

8. A vibratory motor for an electric shaver or the like, comprising support means, a U-shaped magnetic field stator mounted in fixed position on said support means and having arcuate pole faces on the ends of the legs thereof, a pivot shaft mounted on said support means and in centered relationship to said stator pole faces, an oscillator member pivotally mounted on said pivot shaft and having a drive arm extending therefrom adapted for driving engagement with a shaver cutter or the like, a pair of compression springs mounted on said support means and engaging opposite side surfaces of said oscillator member to establish an initial at-rest position of said oscillator on said shaft, an armature member pivotally mounted on said shaft adjacent said oscillator and having arcuate pole faces complementary to said stator pole faces, said armature member being pivotally adjustable on said shaft independently of said oscillator member in said at-rest position thereof for establishing a selected degree of entry of said armature pole faces relative to said stator pole faces, and means carried by said members for securing said armature and oscillator together in the adjusted position of the armature and the at-rest position of the oscillator for vibratory pivotal movement in unison on said shaft.

References Cited
UNITED STATES PATENTS

| | | | |
|---|---|---|---|
| 2,238,390 | 4/1941 | Knopp | 310—29 |
| 2,827,578 | 3/1958 | Carissimi et al. | 310—38 |
| 3,086,133 | 4/1963 | Tolmie | 310—37 X |
| 3,105,163 | 9/1965 | Camp | 310—38 X |

MILTON O. HIRSHFIELD, *Primary Examiner.*

D. F. DUGGAN, *Assistant Examiner.*